US008765345B2

(12) United States Patent
Zhou et al.

(10) Patent No.: US 8,765,345 B2
(45) Date of Patent: Jul. 1, 2014

(54) SUSTAINABLE TONERS

(71) Applicant: Xerox Corporation, Norwalk, CT (US)

(72) Inventors: Ke Zhou, Oakville (CA); Guerino G. Sacripante, Oakville (CA); Yulin Wang, Oakville (CA); Michael D'Amato, Thornhill (CA)

(73) Assignee: Xerox Corporation, Norwalk, CT (US)

( * ) Notice: Subject to any disclaimer, the term of this patent is extended or adjusted under 35 U.S.C. 154(b) by 29 days.

(21) Appl. No.: 13/670,879

(22) Filed: Nov. 7, 2012

(65) Prior Publication Data

US 2014/0127621 A1    May 8, 2014

Related U.S. Application Data

(60) Provisional application No. 61/551,339, filed on Oct. 25, 2011.

(51) Int. Cl.
*G03G 9/087* (2006.01)

(52) U.S. Cl.
USPC ......... 430/109.4; 527/600; 527/604; 528/306

(58) Field of Classification Search
USPC .................. 430/109.4; 527/600, 604; 528/306
See application file for complete search history.

(56) References Cited

U.S. PATENT DOCUMENTS

| | | | |
|---|---|---|---|
| 3,590,000 A | 6/1971 | Palermiti et al. |
| 3,800,588 A | 4/1974 | Larson et al. |
| 4,298,672 A | 11/1981 | Lu |
| 4,338,390 A | 7/1982 | Lu |
| 5,290,654 A | 3/1994 | Sacripante et al. |
| 5,302,486 A | 4/1994 | Patel et al. |
| 5,853,943 A | 12/1998 | Cheng et al. |
| 5,916,725 A | 6/1999 | Patel et al. |
| 6,120,967 A | 9/2000 | Hopper et al. |
| 6,214,507 B1 | 4/2001 | Sokol et al. |
| 6,593,049 B1 | 7/2003 | Veregin et al. |
| 6,756,176 B2 | 6/2004 | Stegamat et al. |
| 6,830,860 B2 | 12/2004 | Sacripante et al. |
| 7,029,817 B2 | 4/2006 | Robinson et al. |
| 7,329,476 B2 | 2/2008 | Sacripante et al. |
| 7,547,499 B2 | 6/2009 | Veregin et al. |
| 7,785,763 B2 | 8/2010 | Agur et al. |
| 8,163,459 B2 | 4/2012 | Farrugia et al. |

(Continued)

OTHER PUBLICATIONS

U.S. Appl. No. 13/336,707, Guerino G. Sacripante et al.

(Continued)

*Primary Examiner* — Hoa V Le
(74) *Attorney, Agent, or Firm* — Pillsbury Winthrop Shaw Pittman LLP

(57) ABSTRACT

Disclosed is a polyester resin containing the polycondensation product of (a) at least one diacid, acid ester, or diester, and (b) at least two diols. The at least two diols include a disproportionated rosin diol and 2,2-bis(4-hydroxyphenyl)propane. Also disclosed is a toner composition having particles which include the disclosed polyester resin. Further disclosed is a method of preparing the disclosed polyester resin, and a method of forming toner particles that includes the disclosed polyester resin.

20 Claims, 2 Drawing Sheets

(56) References Cited

U.S. PATENT DOCUMENTS

| | | |
|---|---|---|
| 2008/0107989 A1 | 5/2008 | Sacripante et al. |
| 2009/0155712 A1 | 6/2009 | Sacripante et al. |
| 2011/0003243 A1 | 1/2011 | Sacripante et al. |
| 2012/0183896 A1 | 7/2012 | Sacripante et al. |
| 2012/0183897 A1 | 7/2012 | Farrugia et al. |
| 2012/0190765 A1 | 7/2012 | Chopra et al. |
| 2012/0264041 A1* | 10/2012 | Yamasaki et al. ............. 430/105 |
| 2012/0276477 A1 | 11/2012 | Wosnick et al. |
| 2012/0276478 A1 | 11/2012 | Wosnick et al. |

OTHER PUBLICATIONS

U.S. Appl. No. 13/359,034, filed Jan. 26, 2012, Valerie M. Farrugia et al.

* cited by examiner

SUSTAINABLE TONERS

TECHNICAL FIELD

This application relates to resins suitable for use in toner compositions used in imaging applications. More specifically, this application relates to rosin-derived resins and toners containing these resins.

RELATED APPLICATIONS

U.S. patent application Ser. No. 13/336,707 to Sacripante et al. discloses a toner composition comprised of a mixture of a bio-based amorphous polyester resin, a crystalline polyester resin, and a colorant.

U.S. patent application Ser. No. 13/359,034 to Farrugia et al. discloses a method of making a bio-based polyester resin, the method comprising performing an esterification reaction between a resin acid and a bio-based polyol to form a macromer; and polycondensing the macromer with at least one diacid in the presence of a catalyst to obtain the bio-based resin.

BACKGROUND

The basic process for the formation and development of images on the surface of photoconductive materials by electrostatic means entails placing a uniform electrostatic charge on a photoconductive insulating layer known as a photoconductor or photoreceptor, exposing the photoreceptor to a light and shadow image to dissipate the charge on the areas of the photoreceptor exposed to the light, and developing the resulting electrostatic latent image by depositing on the image a finely divided electroscopic material known as toner. Toner typically comprises a resin and a colorant. The toner will normally be attracted to those areas of the photoreceptor which retain a charge, thereby forming a toner image corresponding to the electrostatic latent image. This developed image may then be transferred to a substrate such as paper. The transferred image may subsequently be permanently affixed to the substrate by heat, pressure, a combination of heat and pressure, or other suitable fixing means such as solvent or overcoating treatment.

Numerous processes are available for the preparation of toners. Emulsion aggregation (EA) is one such method. Emulsion aggregation toners can be used in forming print and/or xerographic images. Emulsion aggregation techniques can entail the formation of an emulsion latex of the resin particles by heating the resin, using emulsion polymerization, as disclosed in, for example, U.S. Pat. No. 5,853,943, the disclosure of which is totally incorporated herein by reference. Polyester EA ultra low melt (ULM) toners have been prepared utilizing amorphous and crystalline polyester resins as disclosed in, for example, U.S. Pat. No. 7,547,499, the disclosure of which is totally incorporated herein by reference.

Exemplary emulsion aggregation toners include acrylate based toners, such as those based on styrene acrylate toner particles as illustrated in, for example, U.S. Pat. No. 6,120,967, and polyester toner particles, as disclosed in, for example, U.S. Pat. Nos. 5,916,725 and 7,785,763 and U.S. Patent Publication 2008/0107989, the disclosures of each of which are totally incorporated herein by reference.

Many polymeric materials utilized in the formation of toners are based upon the extraction and processing of fossil fuels, leading ultimately to increases in greenhouse gases and accumulation of non-degradable materials in the environment. Energy and environmental policies, increasing and volatile oil prices, and public/political awareness of the rapid depletion of global fossil reserves have created a need to find sustainable monomers derived from biomaterials. By using bio-renewable feedstock, manufacturers can reduce their carbon footprint and move to a zero-carbon or even a carbon-neutral footprint. Bio-based polymers are also very attractive in terms of specific energy and emission savings. Using bio-based feedstock can decrease the amount of plastic targeted for landfills, help provide new sources of income for domestic agriculture, and reduce the economic risks and uncertainty associated with reliance on petroleum.

While known compositions and processes are suitable for their intended purposes, improved resins and toner compositions, including resins and toners derived from sources other than petroleum and/or from renewable resources, are desirable. There is also a need for toners derived from relatively inexpensive sources. In addition, there is a need for toners, such as emulsion aggregation toners, having the aforementioned advantages. Further, there is a need for emulsion aggregation toners derived either from petroleum-based sources or from renewable resources that can be obtained in high yield, have small particle size, have controlled particle morphology or shape, have a narrow particle GSD, and have a core-shell structure.

SUMMARY

In some embodiments, there is provided a polyester resin comprising a polycondensation product of (a) at least one compound selected from the group consisting of diacids, acid esters, and diesters; and (b) at least two diols, wherein the at least two diols comprise a disproportionated rosin diol and 2,2-bis(4-hydroxyphenyl)propane.

Also provided is a toner composition including toner particles comprising a first polyester resin including the polycondensation product of (a) at least one compound selected from the group consisting of diacids, acid esters, and diesters; and (b) at least two diols, wherein the at least two diols comprise a rosin diol and 2,2-bis(4-hydroxyphenyl)propane.

Further provided is a method of preparing a polyester resin, the method including polycondensing (a) at least one compound selected from the group consisting of diacids, acid esters, and diesters; and (b) at least two diols, wherein the at least two diols comprise a rosin diol and 2,2-bis(4-hydroxyphenyl)propane.

EMBODIMENTS

Figure 1:
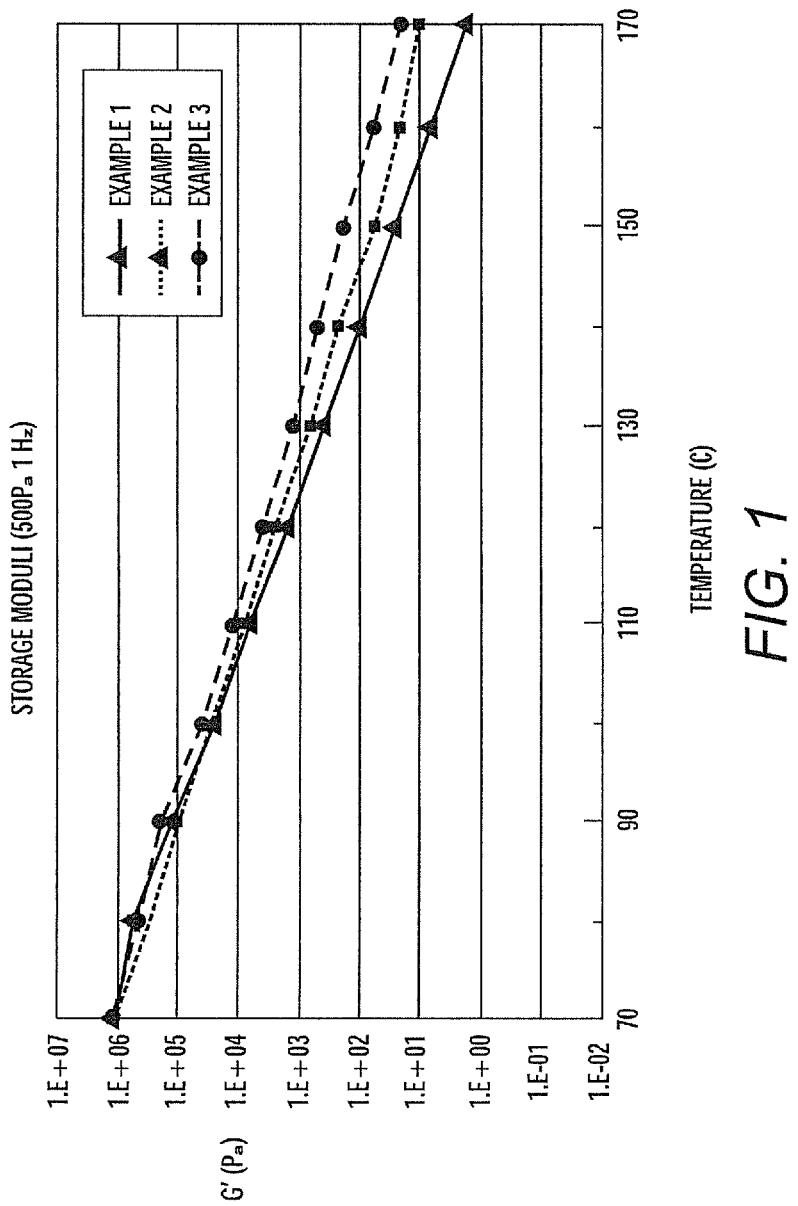
FIG. 1 provides a graphical representation of the storage moduli as a function of temperature for the resins of Examples 1-3.

In this specification and the claims that follow, singular forms such as "a," "an," and "the" include plural forms unless the content clearly dictates otherwise. All ranges disclosed herein include, unless specifically indicated, all endpoints and intermediate values. The term "at least one" refers, for example, to instances in which one of the subsequently described circumstances occurs, and to instances in which more than one of the subsequently described circumstances occurs.

"Optional" or "optionally" refer, for example, to instances in which subsequently described circumstance may or may not occur, and include instances in which the circumstance occurs and instances in which the circumstance does not occur.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

"Diacid" refers, for example, to compounds with two carboxylic acid groups. The term "diacid" also refers to compounds having anhydride functional groups thereon, since anhydride groups convert to diacid groups under polycondensation reaction conditions.

"Diester" refers, for example, to compounds with two ester groups.

"Diol" refers, for example, to compounds with two hydroxyl groups.

The term "viscosity" refers, for example, to a complex viscosity, which is the typical measurement provided by a mechanical rheometer that is capable of subjecting a sample to a steady shear strain or a small amplitude sinusoidal deformation. In this type of instrument, the shear strain is applied by the operator to the motor and the sample deformation (torque) is measured by the transducer. Examples of such instruments are the Rheometrics Fluid Rheometer RFS3 or the ARES mechanical spectrometer, both made by Rheometrics, a division of TA Instruments. Alternatively a controlled-stress instrument, where the shear stress is applied and the resultant strain is measured, may be used. Examples of such instruments are the majority of the current rheometers, the main manufacturers being Anton Parr GmbH, Bohlin Instruments, a division of Malvern Instruments, ATS Rheosystems and TA Instruments. Such a rheometer provides a periodic measurement of viscosity at various plate rotation frequencies, ω, rather than the transient measurement of, for instance, a capillary viscometer. The reciprocating plate rheometer is able to measure both the in phase and out of phase fluid response to stress or displacement. The complex viscosity, $\eta^*$, is defined as $\eta^*=\eta'-i\eta''$; where $\eta'=G''/\omega, \eta''=G'/\omega$ and i is $\sqrt{-1}$. Alternatively a viscometer that can measure only the transient measurement of, for instance, a capillary or shear viscosity, such as those made by Brookfield Engineering Laboratories or Cannon Instrument Company can also be used.

In embodiments, the present disclosure provides resins suitable for use in toner compositions used in imaging applications. More specifically, in embodiments, the present disclosure provides rosin-derived resins and toners containing these resins. A polyester resin produced according to the present disclosure may be the polycondensation product of (a) at least one diacid, acid ester, or diester; and (b) at least two diols, in which the at least two diols include a rosin diol and 2,2-bis(4-hydroxyphenyl)propane.

In embodiments, one or more of the at least two diols may be a rosin diol. A rosin diol may be derived from rosin, a sustainable material that may in turn be derived from conifers and other plants. In embodiments, the rosin diol may be synthesized from a rosin acid. Known methods for synthesizing a rosin diol from a rosin acid include synthesizing the rosin diol from a rosin acid and a bis-epoxide containing bisphenol-A or, alternatively, from a rosin acid and glycerine carbonate, which is also a sustainable material.

In embodiments, the rosin diol may be synthesized from a rosin acid having an acid value of from about 175 mg KOH to about 185 mg KOH, such as from about 176 mg KOH to about 183 mg KOH, or from about 176 mg KOH to about 180 mg KOH. If a rosin acid has an acid value less than this range, the acid value may be increased, for example, through disproportionation and distillation of the rosin acid. For example, a crude rosin acid may have an acid value of less than about 173, such as from about 150 to about 170, or less than about 150. After disproportionation and distillation, the disproportionated distilled rosin acid purified from the crude rosin acid may have an acid value of from about 175 mg KOH to about 185 mg KOH, such as from about 176 mg KOH to about 183 mg KOH, or from about 176 mg KOH to about 180 mg KOH.

In embodiments, one of the at least two diols used to synthesize the polyester resin may be 2,2-bis(4-hydroxyphenyl)propane:

According to known processes, a rosin diol may be polymerized with a mixture of azelaic acid, isophthalic acid (IPA), and propoxylated bisphenol-A (BPA-PO) to form a polyester resin. Bisphenol-A and 2,2-bis(4-hydroxyphenyl)propane have a similar ratio of carbon to oxygen in that both bisphenol-A and 2,2-bis(4-hydroxyphenyl)propane have a C:O ratio of about 15:2. In embodiments, a polyester resin may be synthesized using 2,2-bis(4-hydroxyphenyl)propane. Specifically, the polyester resin may be the polycondensation product of a rosin diol, 2,2-bis(4-hydroxyphenyl)propane, and at least one diacid, acid ester, or diester.

In embodiments, the at least one diacid, acid ester, or diester may be selected from succinic acid (a sustainable monomer), sebacic acid, and IPA, or mixtures thereof. In addition to being sustainable, succinic acid and sebacic acid are also cost-effective monomers. According to the present disclosure, the concentration of the components in a mixture of succinic acid, sebacic acid, and IPA may be adjusted to give the mixture an overall carbon to oxygen ratio of from about 4 to about 6, or from about 4.2 to about 5.2, or from about 4.5 to about 5.0.

In embodiments, the polyester resin produced through the polycondensation of at least one diacid, acid ester, or diester, and at least two diols may have a glass transition temperature of from about 50° C. to about 65° C., such as from about 52° C. to about 62° C., or from about 54° C. to about 60° C. The softening point of the resin may be from about 110° C. to about 130° C., such as from about 113° C. to about 130° C., or from about 115° C. to about 126° C. The acid value of the polyester resin produced according to the instant disclosure may be from about 5 mg KOH/g to about 30 mg KOH/g, such as from about 8 mg KOH/g to about 20 mg KOH/g, or from about 10 mg KOH/g to about 18 mg KOH/g.

In embodiments, the polyester resin according to the instant disclosure may have an effective number average molecular weight (Mn) of from about 1000 to about 50000, such as from about 2000 to about 25000. The resin may have a weight average molecular weight (Mw) of, for example, from about 2000 to about 100000, such as from about 3000 to about 80000. The polydispersity index ($M_w/M_n$) of the polyester resin according to the instant disclosure may be a number of, for example, from about 3 to about 100, such as from about 4 to about 75, or from about 5 to about 30.

In specific embodiments, the polyester resin and/or toner composition produced from bio-renewable resources according to the instant disclosure may be free or substantially free of environmentally-unfriendly compounds, such as bisphenol-A, and/or non-degradable materials. The phrase "substantially free" refers, for example, to a polyester resin or toner composition produced from bio-renewable resources where only trace amounts of environmentally-unfriendly compounds, such as bisphenol-A, and/or non-degradable materials are present; such as, for example, less than about 0.1% by weight environmentally-unfriendly compounds, such as bisphenol-A, or non-degradable materials are present in the polyester resin or toner composition, or from about 0.1% to about 0.001% by weight environmentally-unfriendly compounds, such as bisphenol-A, and/or non-degradable materials are present in the polyester resin or toner composition.

In embodiments, the toner composition may comprise a first polyester resin, such as a polyester resin produced according to the instant disclosure, and may also comprise a second polyester resin. In embodiments, the second polyester resin may be any desired polyester resin, such as a crystalline resin.

In embodiments, a toner composition may comprise toner particles containing the polyester resin produced according to the instant disclosure along with, for example, a wax, a colorant, a surfactant, a coagulant, and one or more additional additives. The toner composition may further contain a crystalline polyester resin. In embodiments, the polyester resin may be amorphous.

In embodiments, the toner prepared according to the present disclosure may be an emulsion aggregation toner. Such a toner may be prepared by any desirable method, such as by forming a slurry by mixing together an emulsion comprising the polyester resin prepared as described above and optionally a wax, a colorant, a surfactant, a coagulant, and one or more additional additives. The slurry may be heated to form aggregated particles in the slurry. Once the particles have reached a desired aggregation size, aggregation may be frozen, or stopped by known methods. Thereafter, the aggregated particles in the slurry may be heated to coalesce the particles into toner particles. The toner particles may have a $GSD_n$ of from about 1.15 to about 1.45, such as from about 1.20 to about 1.35, or from about 1.24 to about 1.31. The particles may have a $GSD_v$ of from about 1.15 to about 1.45, such as from about 1.20 to about 1.35, or from about 1.24 to about 1.31. After aggregation, the toner particles may have a circularity of from about 0.93 to about 0.99, such as from about 0.94 to about 0.99, or from about 0.97 to about 0.99. In embodiments, the toner produced according to the instant disclosure may have a core-shell structure.

Resins

The resins included in the toners disclosed herein may be derived from rosin. Rosin may be derived from conifers and other plants and comprises mixtures of organic acids such as abietic acid and related compounds and isomers, including neoabietic acid, palustric acid, pimaric acid, levo-pimaric acid, isopimaric acid, dehydroabietic acid, sandaracopimaric acid, (the structures of which are illustrated below) and the like:

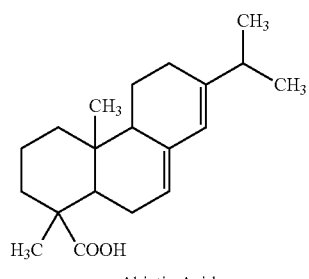
Abietic Acid

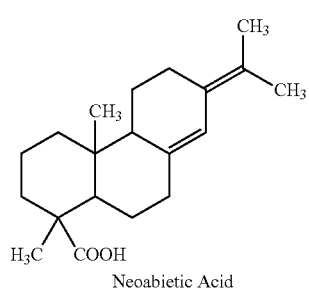
Neoabietic Acid

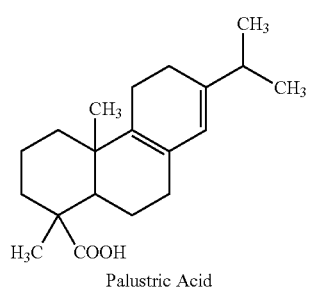
Palustric Acid

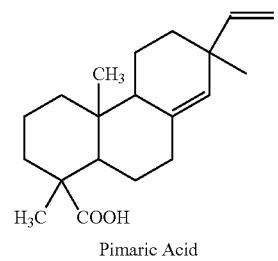
Pimaric Acid

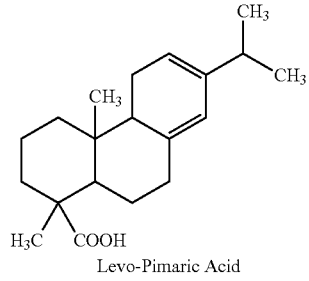
Levo-Pimaric Acid

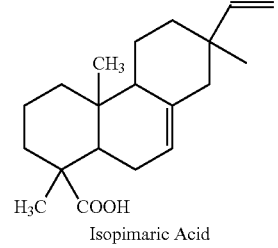
Isopimaric Acid

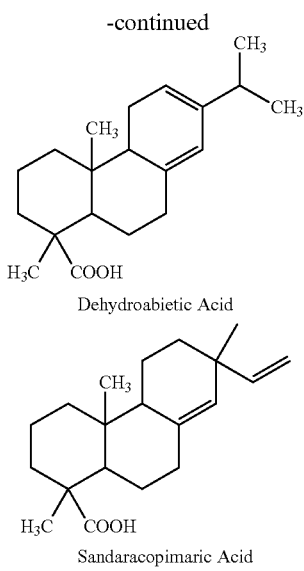

Dehydroabietic Acid

Sandaracopimaric Acid

According to the present disclosure, a polyester resin may be produced by polycondensing (a) at least one compound selected from the group consisting of diacids, acid esters, and diesters, and (b) at least two diols. In embodiments, the at least two diols include a rosin diol and 2,2-bis(4-hydroxyphenyl)propane.

A rosin diol may be synthesized, for example, from a rosin acid. In embodiments, the rosin diol may be synthesized from a rosin acid having an acid value of from about 175 mg KOH to about 185 mg KOH, such as from about 176 mg KOH to about 183 mg KOH. If a rosin acid has an acid value that is less than this range, such as from about 130 mg KOH to about 174 KOH, or from about 140 mg KOH to about 170 mg KOH, or from about 150 mg KOH to about 160 mg KOH, the acid value may be increased through disproportionation and distillation and/or recrystallization of the rosin acid.

Disproportionation involves the exchange of hydrogen between the molecules of the monocarboxylic diterpene acids, or "resin acids," that comprise the rosin, wherein some of the resin acids are hydrogenated while others are dehydrogenated. Disproportionation may be carried out, for example, at a temperature of from about 180° C. to about 350° C., such as from about 200° C. to about 320° C., or from about 250° C. to about 290° C. Disproportionation may be facilitated through the presence of a catalyst. In embodiments, the catalyst may be a metal on carbon catalyst, where the metal may be palladium, platinum, or nickel, or a metal on calcium carbonate catalyst, where the metal may be palladium, platinum, or nickel. Disproportionation may be carried out over a time period of from about 1 hour to about 7 hours, such as from about 2 hours to about 6 hours, or from about 3 hours to about 5 hours. In embodiments, disproportionation and distillation of a resin acid having an acid value less than about 175 mg KOH may increase the acid value by about 0.5% to about 40%, such as from about 1% to about 25%, or from about 2% to about 20%.

The rosin diol may be reacted with (a) at least one diacid, acid ester, or diester, and (b) 2,2-bis(4-hydroxyphenyl)propane in the presence of an optional catalyst to form a polyester resin. Examples of suitable diacids or diesters include terephthalic acid, phthalic acid, isophthalic acid, fumaric acid, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and the like, as well as mixtures thereof.

In embodiments, the diacid, acid ester, or diester monomers are selected to be non-petroleum based, so that the resulting polyester is derived from renewable resources. Examples of such monomers include succinic acid, azelaic acid, citric acid, esters and anhydrides thereof, and the like, as well as mixtures thereof. In embodiments, the at least one diacid, acid ester, or diester is selected from the group consisting of succinic acid, sebacic acid, and isophthalic acid. In embodiments, the at least one diacid, acid ester, or diester is a mixture of succinic acid, sebacic acid, and isophthalic acid. In such embodiments, the concentration of the components in the mixture of succinic acid, sebacic acid, and isophthalic acid may be adjusted to give the mixture an overall carbon to oxygen ratio of, for example, from about 4 to about 6, such as from about 4.2 to about 5.2, or from about 4.5 to about 5.

The polyester resin may have a glass transition temperature (Tg) of, for example, from about 50° C. to about 65° C., such as from about 52° C. to about 62° C., or from about 54° C. to about 60° C.

The polyester resin may have a softening point (Ts) of, for example, from about 110° C. to about 130° C., such as from about 113° C. to about 130° C., or from about 115° C. to about 126° C.

The polyester resin may have an acid value of from about 5 mg KOH/g to about 30 mg KOH/g, such as from about 8 mg KOH/g to about 20 mg KOH/g, or from about 10 mg KOH/g to about 18 mg KOH/g.

The acid value (or "neutralization number" or "acid number" or "acidity") may be measured by dissolving a known amount of polymer sample in an organic solvent and titrating with a solution of potassium hydroxide (KOH) with known concentration and with phenolphthalein as a color indicator. The acid number is the mass of potassium hydroxide in milligrams that is required to neutralize one gram of chemical substance. For the polyester resins, the acid number is the measure of the amount of carboxylic acid groups in a polyester molecule.

In embodiments, the polyester resins prepared from the rosin acids or esters, if desired, can be used in combination with other polyester resins, including those derived from petroleum sources. Examples of other suitable polyester resins include sulfonated, non-sulfonated, crystalline, amorphous, combinations thereof, and the like. The polyester resins can be linear, branched, combinations thereof, and the like. Polyester resins can include those resins disclosed in U.S. Pat. Nos. 6,593,049 and 6,756,176, the disclosures of each of which are totally incorporated herein by reference. Suitable resins also include mixtures of amorphous polyester resins and crystalline polyester resins as disclosed in U.S. Pat. No. 6,830,860, the disclosure of which is totally incorporated herein by reference.

Other examples of suitable polyesters include those formed by reacting a diol with a diacid or diester in the presence of an optional catalyst. For forming a crystalline polyester, suitable organic diols include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, ethylene glycol, combinations thereof, and the like. The aliphatic diol may be in an amount of, for example, from about 40 mol % to about 60 mol %, such as from about 42 mol % to about 55 mol %, or from about 45 mol % to about 53 mol %. The alkali sulfo-aliphatic diol may be in an amount of, for example, from greater than about 0 mol % to about 10 mol %, such as from about 0.5 mol % to about 7 mol %, or from about 1 mol % to about 4 mol %.

Examples of suitable organic diacids or diesters for preparation of crystalline resins include oxalic acid, succinic acid, glutaric acid, adipic acid, suberic acid, azelaic acid, fumaric acid, maleic acid, dodecanedioic acid, sebacic acid, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof, and the like, as well as combinations thereof. The organic diacid may be selected in an amount of, for example, from about 40 mol % to about 60 mol %, such as from about 42 mol % to about 55 mol %, or from about 45 mol % to about 53 mol %.

Examples of suitable crystalline resins include polyesters, polyamides, polyimides, polyolefins, polyethylene, polybutylene, polyisobutyrate, ethylene-propylene copolymers, ethylene-vinyl acetate copolymers, polypropylene, and the like, as well as mixtures thereof. Specific crystalline resins can be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), alkali copoly(5-sulfoisophthaloyl)-copoly(ethylene-adipate), poly(decylene-sebacate), poly(decylene-decanoate), poly-(ethylene-decanoate), poly-(ethylene-dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), and the like, as well as mixtures thereof. The crystalline resin may be present in an amount of, for example, from about 5 percent by weight of the toner components to about 50 percent by weight of the toner components, such as from about 8% by weight to about 40% by weight, or from about 10% by weight to about 35% by weight. The crystalline resin may possess a melting point of, for example, from about 30° C. to about 120° C., such as from about 40° C. to about 100° C., or from about 50° C. to about 90° C. The crystalline resin may have an effective number average molecular weight (Mn), as measured by gel permeation chromatography (GPC), of from about 1,000 to about 50,000, such as from about 1,500 to about 35,000, or from about 2,000 to about 25,000. The crystalline resin may have a weight average molecular weight (Mw) of, for example, from about 2,000 to about 100,000, such as from about 2,000 to about 90,000, or from about 3,000 to about 80,000, as determined by Gel Permeation Chromatography using polystyrene standards. The molecular weight distribution (Mw/Mn) of the crystalline resin may be a number of, for example, from about 2 to about 6, such as from about 3 to about 4.

Examples of suitable diacid or diesters for preparation of amorphous polyesters include dicarboxylic acids, anhydrides, or diesters, such as terephthalic acid, phthalic acid, isophthalic acid, fumaric acid, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and the like, as well as mixtures thereof. The organic diacid or diester can be present in an amount of, for example, from about 40 mol % to about 60 mol % of the resin, such as from about 42 mol % to about 55 mol % of the resin, or from about 45 mol % to about 53 mol % of the resin.

Examples of suitable diols for generating amorphous polyesters include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene, and the like, as well as mixtures thereof. The organic diol can be present in an amount of, for example, from about 40 mol % to about 60 mol %, such as from about 42 mol % to about 55 mol %, or from about 45 mol % to about 53 mol %.

Examples of suitable amorphous resins include polyesters, polyamides, polyimides, polyolefins, polyethylene, polybutylene, polyisobutyrate, ethylene-propylene copolymers, ethylene-vinyl acetate copolymers, polypropylene, and the like, as well as mixtures thereof.

Suitable crystalline resins also include those disclosed in U.S. Pat. No. 7,329,476, the disclosure of which is totally incorporated herein by reference. One specific suitable crystalline resin comprises ethylene glycol and a mixture of dodecanedioic acid and fumaric acid co-monomers with the following formula:

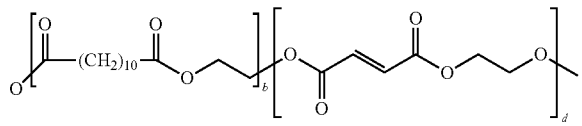

wherein b is from about 5 to about 2000 and d is from about 5 to about 2000. Another suitable crystalline resin is of the formula

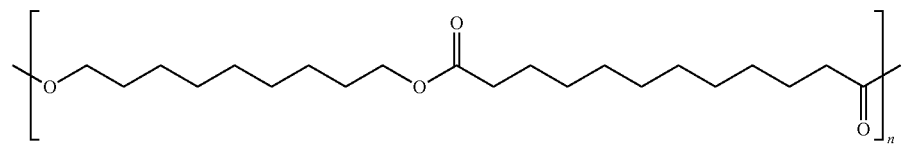

wherein n represents the number of repeat monomer units.

Emulsification

The emulsion to prepare emulsion aggregation particles can be prepared by any desired or effective method, such as a solventless emulsification method or phase inversion process as disclosed in, for example, U.S. Patent Application Publication No. 2009/0155712, the disclosure of which is totally incorporated herein by reference. For example, a process of the present disclosure may include contacting at least one resin with a solvent to form a resin mixture; heating the resin mixture to an elevated temperature; stirring the mixture; adding a neutralizing agent to neutralize the acid groups of the resin; adding water dropwise into the mixture until phase inversion occurs to form a phase-inverted latex emulsion; distilling the latex to remove a water/solvent mixture in the distillate and produce a high quality latex; and separating the solvent from the water in the distillate. The solvent thus separated from the distillate may, in embodiments, be reused, thereby making the processes of the instant disclosure more environmentally-friendly.

Processes for preparing the emulsion may also include a solvent flash method, as disclosed in, for example, U.S. Pat. No. 7,029,817, the disclosure of which is totally incorporated herein by reference. Such processes may include dissolving the resin in a water miscible organic solvent, mixing with hot water, and thereafter removing the organic solvent from the mixture by flash methods, thereby forming an emulsion of the resin in water. The solvent can be removed by distillation and recycled for future emulsifications.

Any other desired or effective emulsification process may also be used.

Toner

The toner particles can be prepared by any desired or effective method. Although embodiments relating to toner particle production are described below with respect to emulsion-aggregation processes, any suitable method of preparing toner particles may be used, including chemical processes, such as suspension and encapsulation processes disclosed in U.S. Pat. Nos. 5,290,654 and 5,302,486, the disclosures of each of which are totally incorporated herein by reference. Toner compositions and toner particles can be prepared by aggregation and coalescence processes in which small-size resin particles are aggregated to the appropriate toner particle size and then coalesced to achieve the final toner-particle shape and morphology.

Toner compositions can be prepared by emulsion-aggregation processes that include aggregating a mixture of an optional colorant, an optional wax, any other desired or required additives, and emulsions including the selected resins described above, optionally in surfactants, and then coalescing the aggregate mixture. A mixture can be prepared by adding an optional colorant and optionally a wax or other materials, which can also be optionally in a dispersion(s) including a surfactant, to the emulsion, which can also be a mixture of two or more emulsions containing the resin.

Surfactants

Colorants, waxes, and other additives used to form toner compositions may be in dispersions that include surfactants. Moreover, toner particles may be formed by emulsion aggregation methods where the resin and other components of the toner are placed in contact with one or more surfactants, an emulsion is formed, toner particles are aggregated, coalesced, optionally washed and dried, and recovered.

One or more surfactants may be used. The surfactants may be selected from ionic surfactants and nonionic surfactants. Anionic surfactants and cationic surfactants are encompassed by the term "ionic surfactants." The surfactant may be present in an amount of from about 0.01 to about 5 weight percent of the toner composition, such as from about 0.75 to about 4% by weight of the toner composition, or from about 1 to about 3 weight percent of the toner composition.

Examples of nonionic surfactants include polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™, and ANTAROX897™. Other examples of suitable nonionic surfactants include a block copolymer of polyethylene oxide and polypropylene oxide, including those commercially available as SYNPERONIC PE/F, such as SYNPERONIC PE/F 108.

Anionic surfactants include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ available from Daiichi Kogyo Seiyaku, combinations thereof, and the like. Other suitable anionic surfactants include DOWFAX™ 2A1, an alkyldiphenyloxide disulfonate from Dow Chemical Company, and/or TAYCA POWER BN2060 from Tayca Corporation (Japan), which are branched sodium dodecyl benzene sulfonates. Combinations of these surfactants and any of the foregoing anionic surfactants can be used.

Examples of cationic surfactants, which are usually positively charged, include alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, as well as mixtures thereof.

Wax

In addition to the polymer binder resin, the toners may also contain a wax, either a single type of wax or a mixture of two or more different waxes. A single wax can be added to toner formulations, for example, to improve particular toner properties, such as toner particle shape, presence and amount of wax on the toner particle surface, charging and/or fusing characteristics, gloss, stripping, offset properties, and the like. Alternatively, a combination of waxes may be added to provide multiple properties to the toner composition.

When included, the wax can be present, for example, from about 1% by weight to about 25% by weight, such as from about 3% by weight to about 23% by weight, or from about 5% by weight to about 20% by weight. Examples of suitable waxes include those having, for example, a weight average molecular weight of from about 500 to about 20,000, such as from about 750 to about 15,000, or from about 1,000 to about 10,000. Examples of suitable waxes include polyolefins, such as polyethylene, polypropylene, and polybutene waxes, including those commercially available from Allied Chemical and Petrolite Corporation, for example POLYWAX™ polyethylene waxes from Baker Petrolite, wax emulsions available from Michaelman, Inc. and Daniels Products Company, EPOLENE N-15™ commercially available from Eastman Chemical Products, Inc., and VISCOL 550-P™, a low weight average molecular weight polypropylene available from Sanyo Kasei K. K., and the like; plant-based waxes, such as carnauba wax, rice wax, candelilla wax, sumacs wax, jojoba oil, and the like; animal-based waxes, such as beeswax and the like; mineral-based waxes and petroleum-based waxes, such as montan wax, ozokerite, ceresin, paraffin wax, microcrystalline wax, Fischer-Tropsch wax, and the like;

ester waxes obtained from higher fatty acids and higher alcohols, such as stearyl stearate, behenyl behenate, and the like; ester waxes obtained from higher fatty acid and monovalent or multivalent lower alcohols, such as butyl stearate, propyl oleate, glyceride monostearate, glyceride distearate, pentaerythritol tetrabehenate, and the like; ester waxes obtained from higher fatty acids and multivalent alcohol multimers, such as diethyleneglycol monostearate, dipropyleneglycol distearate, diglyceryl distearate, triglyceryl tetrastearate, and the like; sorbitan higher fatty acid ester waxes, such as sorbitan monostearate and the like; and cholesterol higher fatty acid ester waxes, such as cholesteryl stearate and the like; and the like, as well as mixtures thereof. Examples of suitable functionalized waxes include amines, amides, for example AQUA SUPERSLIP 6550™, SUPERSLIP 6530™ available from Micro Powder Inc., fluorinated waxes, for example POLYFLUO190™, POLYFLUO200™, POLYSILK 19™, POLYSILK 14™ available from Micro Powder Inc., mixed fluorinated amide waxes, for example MICROSPERSION 19™ available from Micro Powder Inc, imides, esters, quaternary amines, carboxylic acids or acrylic polymer emulsions, for example JONCRYL 74™, 89™, 130™, 537™, and 538™, all available from SC Johnson Wax, chlorinated polypropylenes and polyethylenes available from Allied Chemical and Petrolite Corporation and SC Johnson wax, and the like, as well as mixtures thereof. Mixtures and combinations of the foregoing waxes can also be used. Waxes can be included as, for example, fuser roll release agents.

The toners may contain the wax in any amount of from, for example, about 1 to about 25 weight percent of the toner, such as from about 3 to about 15 weight percent of the toner, on a dry basis; or from about 5 to about 20 weight percent of the toner, or from about 5 to about 11 weight percent of the toner.

Colorants

The toners may also contain at least one colorant. For example, colorants or pigments may include pigment, dye, mixtures of pigment and dye, mixtures of pigments, mixtures of dyes, and the like. The term "colorant" refers, for example, to such colorants, dyes, pigments, and mixtures, unless specified as a particular pigment or other colorant component. The colorant may comprise a pigment, a dye, mixtures thereof, carbon black, magnetite, black, cyan, magenta, yellow, red, green, blue, brown, and mixtures thereof, in an amount of about 0.1 to about 35 weight percent based upon the total weight of the composition, such as from about 1 to about 25 weight percent.

Examples of suitable colorants include pigments, dyes, mixtures thereof, and the like. Specific examples include carbon black; magnetite; HELIOGEN BLUE L6900, D6840, D7080, D7020, PYLAM OIL BLUE, PYLAM OIL YELLOW, and PIGMENT BLUE 1, available from Paul Uhlich and Company, Inc.; PIGMENT VIOLET 1, PIGMENT RED 48, LEMON CHROME YELLOW DCC 1026, E.D. TOLUIDINE RED, and BON RED C, available from Dominion Color Corporation, Ltd., Toronto, Ontario; NOVAPERM YELLOW FGL and HOSTAPERM PINK E, available from Hoechst; CINQUASIA MAGENTA, available from E.I. DuPont de Nemours and Company; 2,9-dimethyl-substituted quinacridone and anthraquinone dye identified in the Color Index as CI-60710, CI Dispersed Red 15, diazo dye identified in the Color Index as CI-26050, CI Solvent Red 19, copper tetra(octadecyl sulfonamido) phthalocyanine, x-copper phthalocyanine pigment listed in the Color Index as CI-74160, CI Pigment Blue, Anthrathrene Blue identified in the Color Index as CI-69810, Special Blue X-2137, diarylide yellow 3,3-dichlorobenzidene acetoacetanilides, a monoazo pigment identified in the Color Index as CI-12700, CI Solvent Yellow 16, a nitrophenyl amine sulfonamide identified in the Color Index as Foron Yellow SE/GLN, CI Dispersed Yellow 33,2,5-dimethoxy-4-sulfonanilide phenylazo-4'-chloro-2,5-dimethoxy acetoacetanilide, Yellow 180, Permanent Yellow FGL; Neopen Yellow 075, Neopen Yellow 159, Neopen Orange 252, Neopen Red 336, Neopen Red 335, Neopen Red 366, Neopen Blue 808, Neopen Black X53, Neopen Black X55; Pigment Blue 15:3 having a Color Index Constitution Number of 74160, Magenta Pigment Red 81:3 having a Color Index Constitution Number of 45160:3, Yellow 17 having a Color Index Constitution Number of 21105; Pigment Red 122 (2,9-dimethylquinacridone), Pigment Red 185, Pigment Red 192, Pigment Red 202, Pigment Red 206, Pigment Red 235, Pigment Red 269, combinations thereof, and the like.

Toner Preparation

The pH of the resulting mixture can be adjusted by an acid, such as acetic acid, nitric acid, or the like. In embodiments, the pH of the mixture can be adjusted to from about 2 to about 4.5. Additionally, if desired, the mixture can be homogenized. If the mixture is homogenized, homogenization can be performed by mixing at from about 600 to about 4,000 revolutions per minute, such as from about 800 to about 3,500, or from about 1,000 to about 3,000. Homogenization can be performed by any desired or effective method, for example, with an IKA ULTRA TURRAX T50 probe homogenizer.

Following preparation of the above mixture, an aggregating agent can be added to the mixture. Suitable aggregating agents include aqueous solutions of divalent cations or a multivalent cations. Specific examples of aggregating agents include polyaluminum halides such as polyaluminum chloride (PAC), or the corresponding bromide, fluoride, or iodide, polyaluminum silicates, such as polyaluminum sulfosilicate (PASS), and water soluble metal salts, including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and the like, as well as mixtures thereof. In embodiments, the aggregating agent can be added to the mixture at a temperature below the glass transition temperature (Tg) of the resin.

The aggregating agent can be added to the mixture used to form a toner in an amount of from about 0.1% by weight of the resin in the mixture to about 8% by weight, such as from about 0.2% by weight to about 7% by weight, or from about 0.5% by weight to about 5% by weight. To control aggregation and coalescence of the particles, the aggregating agent can, if desired, be metered into the mixture over time. For example, the agent can be metered into the mixture over a period of from about 5 minutes to about 240 minutes, such as from about 10 minutes to about 220 minutes, or from about 30 minutes to about 200 minutes. The addition of the agent can also be performed while the mixture is maintained under stirred conditions, such as from about 50 rpm to about 1,000 rpm, or from about 75 rpm to about 750 rpm, or from about 100 rpm to about 500 rpm. In embodiments, the agent can be metered into the mixture at a temperature that is below the glass transition temperature of the resin as discussed above, such as from about 30° C. to about 90° C., or from about 33° C. to about 80° C., or from about 35° C. to about 70° C.

The particles may be permitted to aggregate until a predetermined desired particle size is obtained. A predetermined desired size refers to the desired particle size to be obtained as determined prior to formation, with the particle size being monitored during the growth process until this particle size is reached. Samples can be taken during the growth process and analyzed, for example with a Coulter Counter, for average particle size. Aggregation can thus proceed by maintaining the elevated temperature, or by slowly raising the temperature to, for example, from about 40° C. to about 100° C., such as from about 50° C. to about 98° C., or from about 70° C. to about 96° C., and holding the mixture at this temperature for a time from about 0.5 hours to about 6 hours, such as from about 1 hour to about 5 hours, or from about 1.5 hours to about 4 hours, while maintaining stirring, to provide the aggregated particles. Once the predetermined desired particle size is reached, the growth process may be halted.

The growth and shaping of the particles following addition of the aggregation agent can be performed under any suitable conditions. For example, the growth and shaping can be conducted under conditions in which aggregation occurs separate from coalescence. For separate aggregation and coalescence stages, the aggregation process can be conducted under shearing conditions at an elevated temperature, for example of from about 40° C. to about 90° C., such as from about 43° C. to about 85° C., or from about 45° C. to about 80° C., which may be below the glass transition temperature of the resin as discussed above.

Shell Formation

An optional shell can then be applied to the formed aggregated toner particles. Any resin described above as suitable for the core resin can be used as the shell resin. The shell resin can be applied to the aggregated particles by any desired or effective method. For example, the shell resin can be in an emulsion, including a surfactant. The aggregated particles described above can be combined with said shell resin emulsion so that the shell resin forms a shell over the formed aggregates. In embodiments, an amorphous polyester can be used to form a shell over the aggregates to form toner particles having a core-shell configuration.

Once the desired final size of the toner particles is achieved, the pH of the mixture can be adjusted with a base to a value in one embodiment of from about 6 to about 10, such as from about 6.1 to about 8, or from about 6.2 to about 7. The adjustment of the pH can be used to freeze, that is to stop, toner growth. The base used to stop toner growth can include any suitable base, such as alkali metal hydroxides, including sodium hydroxide and potassium hydroxide, ammonium hydroxide, combinations thereof, and the like. In specific embodiments, ethylene diamine tetraacetic acid (EDTA) can be added to help adjust the pH to the desired values noted above. In embodiments, the base can be added in amounts from about 2 to about 25% by weight of the mixture, such as from about 3% to about 20%, or from about 4% to about 10% by weight of the mixture.

Coalescence

Following aggregation to the desired particle size, with the formation of the optional shell as described above, the particles can then be coalesced to the desired final shape, the coalescence being achieved by, for example, heating the mixture to a temperature of from about 55° C. to about 100° C., such as from about 65° C. to about 75° C., or from about 68° C. to about 72° C. Higher or lower temperatures may be used, it being understood that the temperature is a function of the resins used for the binder.

Coalescence can proceed and be performed, for example, over a time period of from about 0.1 hours to about 9 hours, such as from about 0.3 hours to about 7 hours, or from about 0.5 hours to about 4 hours.

After coalescence, the mixture may be cooled to room temperature (about 20° C. to about 25° C.). The cooling can be rapid or slow, as desired. A suitable cooling method can include introducing cold water to a jacket around the reactor.

After cooling, the toner particles can be optionally washed with water and then dried. Drying can be accomplished by any suitable method for drying including, for example, freeze-drying.

Optional Additives

The toner particles can also contain other optional additives as desired. For example, the toner can include positive or negative charge control agents in an amount, for example, of from about 0.1% by weight of the toner to about 10% by weight of the toner, such as from about 0.5% to about 5%, or from about 1% to about 3%. Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which is totally incorporated herein by reference; organic sulfate and sulfonate compositions, including those disclosed in U.S. Pat. No. 4,338,390, the disclosure of which is totally incorporated herein by reference; cetyl pyridinium tetrafluoroborates; distearyl dimethyl ammonium methyl sulfate; aluminum salts such as BONTRON E84™ or E88™ (Hodogaya Chemical); and the like, as well as mixtures thereof. Such charge control agents can be applied simultaneously with the optional shell resin described above or after application of the optional shell resin.

There can also be blended with the toner particles external additive particles, including flow aid additives, which can be present on the surfaces of the toner particles. Examples of these additives include metal oxides, such as titanium oxide, silicon oxide, tin oxide, and the like, as well as mixtures thereof; colloidal and amorphous silicas, such as AEROSIL®, metal salts and metal salts of fatty acids including zinc stearate, aluminum oxides, cerium oxides, and the like, as well as mixtures thereof. Each of these external additives can be present in an amount of, for example, from about 0.1% by weight of the toner to about 5% by weight of the toner, such as from about 0.2% to about 4%, or from about 0.25% to about 3%. Suitable additives include those disclosed in U.S. Pat. Nos. 3,590,000, 3,800,588, and 6,214,507, the disclosures of each of which are totally incorporated herein by reference. These additives can be applied simultaneously with an optional shell resin described above or after application of an optional shell resin.

The toner particles can be formulated into a developer composition. The toner particles can be mixed with carrier particles to achieve a two-component developer composition. The toner concentration in the developer can be of a concentration of, for example, from about 1% to about 25%, such as from about 1.5% to about 20%, or from about 2% to about 15% by weight of the total weight of the developer.

The toner particles may be measured for circularity, such as with a Sysmex FPIA 2100 analyzer. A circularity of 1.000 indicates a completely circular sphere. Circularity can be measured with, for example, a Sysmex FPIA 2100 analyzer. In embodiments, the toner particles produced according to the instant disclosure may have a circularity of from about 0.93 to about 0.99, such as from about 0.94 to about 0.98, or from about 0.95 to about 0.97.

Emulsion aggregation processes provide greater control over the distribution of toner particle sizes and can limit the amount of both fine and coarse toner particles in the toner. The toner particles can have a relatively narrow particle size distribution with a lower number ratio geometric standard deviation ($GSD_n$) in embodiments of from about 1.15 to about 1.45, such as from about 1.20 to about 1.35, or from about 1.24 to about 1.31.

The toner particles may have a particle size of from about 3 μm to about 20 μm, such as from about 3 μm to about 10 μm, or from about 5 μm to about 7 μm.

Toners produced according to the instant disclosure may exhibit a heat cohesion at about 50° C. to about 55° C. of from about 0 to about 20 wt. %, such as from about 3 to about 15 wt. %, or from about 5 to about 10 wt. %.

The characteristics of the toner particles may be determined by any suitable technique and apparatus.

In embodiments where the toner resin is crosslinkable, such crosslinking can be performed in any desired or effective manner. For example, the toner resin can be crosslinked during fusing of the toner to the substrate when the toner resin is crosslinkable at the fusing temperature. Crosslinking can also be effected by heating the fused image to a temperature at which the toner resin will be crosslinked, for example in a post-fusing operation. In embodiments, crosslinking can be effected at temperatures of, for example, about 160° C. or less, such as from about 70° C. to about 160° C., or from about 80° C. to about 140° C.

Examples are set forth below and are illustrative of different compositions and conditions that can be utilized in practicing the disclosure. All proportions are by weight unless otherwise indicated. It will be apparent, however, that the disclosure can be practiced with many types of compositions and can have many different uses in accordance with the disclosure above and as pointed out hereinafter.

EXAMPLES

Example 1

A 1-L Parr reactor equipped with a mechanical stirrer, bottom drain valve, and distillation apparatus was charged with 302.4 grams of a commercially disproportionated rosin acid (obtained from Arakawa Kagaku Kogyo Kabushiki Kaisha), 132.2 grams glycerine carbonate, and 0.83 grams tetraethyl ammonium iodide. The reactor was heated to 170° C. and stirring was maintained for six hours. The mixture was sampled every hour until the mixture was found to have an acid value <1 mg KOH/g.

153.4 grams of 2,2-bis(4-hydroxyphenyl)propane, 66.4 grams isophthalic acid, 80.8 g sebacic acid, 97.7 grams succinic acid, and 1.5 grams Fascat 4100 catalyst were added to the mixture. The mixture was heated to from about 215° C. to about 220° C. until the polyester resin exhibited a softening point of 120-122° C.

Example 2

To a three neck round bottom flask equipped with a reflux condenser was added 200 grams of a commercially available disproportionated rosin acid (obtained from Arakawa Kagaku Kogyo Kabushiki Kaisha) having an acid value of 173, and 0.0666 grams of a palladium supported on carbon catalyst. The mixture was heated at 280° C. for 4 hours under Ar atmosphere, followed by vacuum distillation. Approximately 124 grams of rosin was collected at a temperature of from about 210° C. to 250° C. The acid value of the purified rosin acid reached about 178 to about 183 mg KOH/g rosin.

A 1-L Parr reactor equipped with a mechanical stirrer, bottom drain valve, and distillation apparatus was charged with 302.4 grams of the purified rosin acid, 132.2 grams glycerine carbonate, and 0.83 grams tetraethyl ammonium iodide. The reactor was heated to 170° C. and stirring was maintained for six hours. The mixture was sampled every hour until the mixture was found to have an acid value <1 mg KOH/g.

153.4 grams of 2,2-bis(4-hydroxyphenyl)propane, 66.4 grams isophthalic acid, 80.8 grams sebacic acid, 97.7 grams succinic acid, and 1.5 grams Fascat 4100 catalyst were added to the mixture. The mixture was heated to from about 215° C. to about 220° C. until the polyester resin exhibited a softening point of 120-122° C.

Example 3

To a three neck round bottom flask equipped with a reflux condenser was added 450 grams of a commercially available disproportionated rosin acid (obtained from Rosin Chemical (Wuping) Co. Ltd.) having an acid value of 155, and 0.135 grams of a palladium supported on carbon catalyst. The mixture was heated at 280° C. for 5 hours under an Ar atmosphere, followed by vacuum distillation. About 124 grams of rosin was collected at from about 210° C. to 250° C. The acid value of the purified rosin acid reached about 178 to about 183 mg KOH/g rosin.

A 1-L Parr reactor equipped with a mechanical stirrer, bottom drain valve, and distillation apparatus was charged with 302.4 grams of the rosin acid purified as described above, 132.2 grams glycerine carbonate, and 0.83 grams tetraethyl ammonium iodide. The reactor was heated to 170° C. and stirring was maintained for six hours. The mixture was sampled every hour until the mixture was found to have an acid value <1 mg KOH/g.

153.4 grams of 2,2-bis(4-hydroxyphenyl)propane, 66.4 grams isophthalic acid, 80.8 grams sebacic acid, 97.7 grams succinic acid, and 1.5 grams Fascat 4100 catalyst were added to the mixture. The mixture was heated to from about 215° C. to about 220° C. until the polyester resin exhibited a softening point of 120-122° C.

The characteristics of the resins of Examples 1-3 are summarized in Table 1.

TABLE 1

| EXAMPLE | Tg (° C.) | Ts (° C.) | Acid value | Mn/Mw | Pd |
| --- | --- | --- | --- | --- | --- |
| 1 | 56.6 | 121.7 | 15.87 | 2510/83460 | 33 |
| 2 | 58.7 | 121.5 | 17.78 | 2584/64269 | 24 |
| 3 | 57.9 | 125.7 | 14.04 | 7212/131209 | 18 |

Rheology values were measured for the resins of Examples 1-3 with an AR 2000 Rheometer. Values measured were: storage modulus (G'), in units of Pascals, which is the stress in phase with the deformation divided by the strain, or a measure of the elasticity of the sample; and complex viscosity (n*), in units of Pascal-seconds, which is the complex modulus divided by the frequency, a value used in shear testing.

Figure 2:
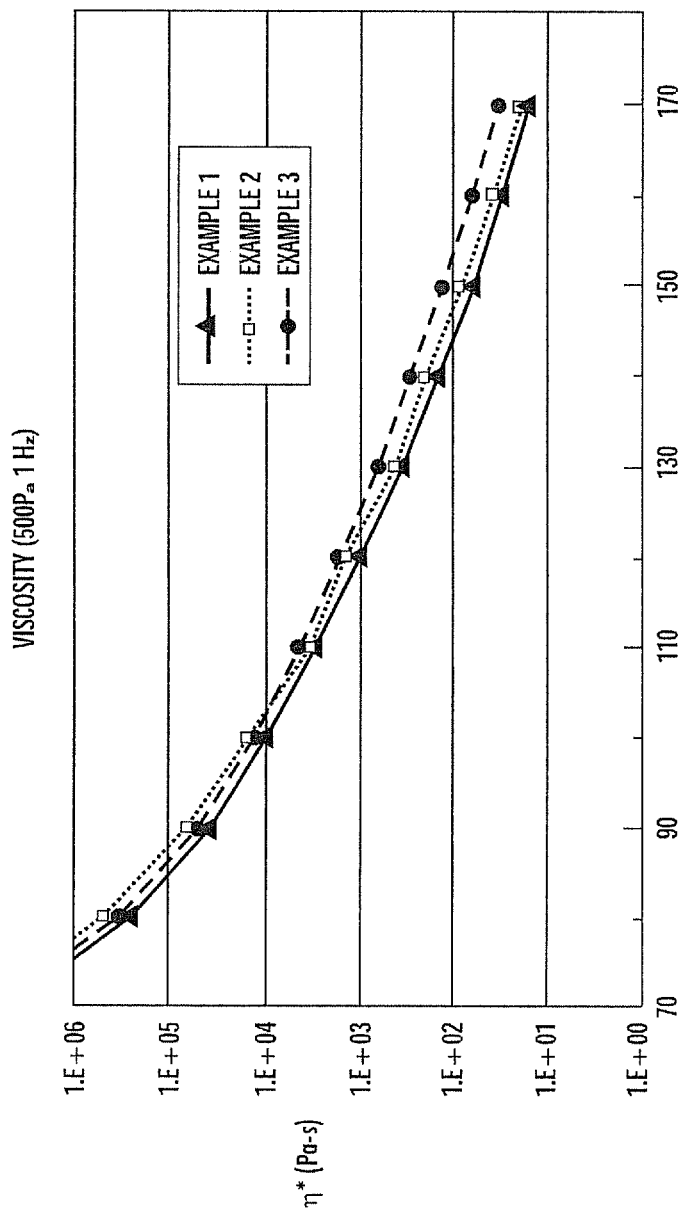
FIG. 2 provides a graphical representation of the viscosity as a function of temperature for the resins of Examples 1-3.

FIG. 1 provides a graphical representation the storage moduli as a function of temperature for the resins of Examples 1-3. FIG. 2 depicts complex viscosity as a function of temperature for the resins of Examples 1-3.

Example 4

An emulsion aggregation toner was prepared as follows. To a 2 L glass reactor equipped with an overhead mixer was added 312.96 grams of the emulsion of Example 1 (19.44 wt %), 23.38 grams crystalline resin emulsion (35.60 wt %), 36.67 grams IGI wax dispersion (30.19 wt %), and 41.80 grams cyan pigment PB15:3 (17.21 wt %). Separately, 1.51 grams $Al_2(SO_4)_3$ (27.85 wt %) was added in as the flocculent under homogenization. The mixture was heated to 39.2° C. to aggregate the particles while stirring at 300 rpm. The particle size was monitored with a Coulter Counter until the core particles reached a volume average particle size of 4.73 μm with a $GSD_v$ of 1.21, and then 172.84 grams of the resin emulsion of Example 1 was added as shell material, resulting in a core-shell structured particles with an average particle size of 5.60 μm, $GSD_v$ 1.19. Thereafter, the pH of the reaction slurry was then increased to 7.9 using 4 wt % NaOH solution followed by 2.50 grams EDTA (39 wt %) to freeze the toner growth. After freezing, the reaction mixture was heated to 85° C., and pH was reduced to 7.47 using pH 5.7 acetic acid/sodium acetate (HAc/NaAc) buffer solution for coalescence. The toner was quenched after coalescence, resulting in a final particle size of 5.77 μm, $GSD_v$ of 1.21, $GSD_n$ of 1.25, and circularity of 0.983. The toner slurry was then cooled to room temperature, separated by sieving (25 mm), filtered, washed, and freeze dried.

Example 5

An emulsion aggregation toner was prepared as followed. To a 2 L glass reactor equipped with an overhead mixer was added 311.52 grams of the polyester emulsion of Example 2 (19.53 wt %), 23.38 grams crystalline resin emulsion (35.60 wt %), 36.67 grams IGI wax dispersion (30.19 wt %), and 41.80 grams cyan pigment PB15:3 (17.21 wt %). Separately, 1.29 grams $Al_2(SO_4)_3$ (27.85 wt %) was added in as a flocculent under homogenization. The mixture was heated to 39.7° C. to aggregate the particles while stirring at 300 rpm. The particle size was monitored with a Coulter Counter until the core particles reached a volume average particle size of 5.15 μm with a $GSD_v$ of 1.25. Then, 172.04 grams of the resin emulsion of Example 2 was added as shell material, resulting in core-shell structured particles with an average particle size of 5.77 μm, GSDv of 1.23. Thereafter, the pH of the reaction slurry was increased to 8.15 using 4 wt % NaOH solution followed by 2.50 grams EDTA (39 wt %) to freeze the toner growth. After freezing, the reaction mixture was heated to 85° C., and pH was reduced to 7.6 using pH 5.7 acetic acid/sodium acetate (HAc/NaAc) buffer solution for coalescence. The toner was quenched after coalescence, resulting in a final particle size of 6.02 μm, $GSD_v$ of 1.24, $GSD_n$ of 1.30, and a circularity of 0.978. The toner slurry was then cooled to room temperature, separated by sieving (25 mm), filtered, washed, and freeze dried.

Example 6

An emulsion aggregation toner was prepared as follows. To a 2 L glass reactor equipped with an overhead mixer was added 433.59 grams of the polyester emulsion of Example 3 (13.73 wt %), 22.21 grams crystalline resin emulsion (35.60 wt %), 34.83 grams IGI wax dispersion (30.19 wt %), and 39.71 grams cyan pigment PB15:3 (17.21 wt %). Separately, 2.04 grams $Al_2(SO_4)_3$ (27.85 wt %) was added in as a flocculent under homogenization. The mixture was heated to 44.5° C. to aggregate the particles while stirring at 300 rpm. The particle size was monitored with a Coulter Counter until the core particles reached a volume average particle size of 4 μm with a $GSD_v$ of 1.23. Then, 239.46 grams of the resin emulsion of Example 3 was added as shell material, resulting in core-shell structured particles with an average particle size of 6.61 μm with a $GSD_v$ of 1.24. Thereafter, the pH of the reaction slurry was increased to 8.6 using 4 wt % NaOH solution followed by 4.39 grams EDTA (39 wt %) to freeze the toner growth. After freezing, the reaction mixture was heated to 85° C., and the pH was reduced to 7.08 using pH 5.7 acetic acid/sodium acetate (HAc/NaAc) buffer solution for coalescence. The toner was quenched after coalescence, resulting in a final particle size of 6.97 μm, $GSD_v$ of 1.27, $GSD_n$ of 1.41, and a circularity of 0.973. The toner slurry was then cooled to room temperature, separated by sieving (25 mm), filtered, washed, and freeze dried.

Determining the Heat Cohesion

A first open dish was charged with 5 grams of the toner prepared according to Example 4, a second open dish was charged with 5 grams of the toner prepared according to Example 5, and a third open dish was charged 5 grams of the toner prepared according to Example 6. The samples were conditioned in an environmental chamber at 55° C. and 50% relative humidity. After 24 hours, the samples were removed and acclimated in ambient conditions for 30 minutes. Each re-acclimated sample was then poured into a stack of two pre-weighed mesh sieves which were stacked with 1,000 μm on top and 106 μm on bottom. The sieves were vibrated with a Hosokawa flow tester for 90 seconds at an amplitude of 1 mm. After the vibration was completed, the sieves were reweighed and toner heat cohesion was calculated from the total amount of toner remaining on both sieves as a percentage of the starting weight.

The heat cohesion results of the toners of Examples 4-6 are summarized in Table 2. The blocking onset temperature corresponds to the highest temperature for each example where heat cohesion remained less than 20%.

TABLE 2

| | 50° C. | 51° C. | 52° C. | 53° C. | Blocking Onset Temp (° C.) |
|---|---|---|---|---|---|
| Example 4 | 10% | NA | 81% | 94% | >50 |
| Example 5 | NA | NA | 9% | 48% | 52 |
| Example 6 | NA | NA | 9% | 38% | 52 |

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A polyester resin comprising a polycondensation product of:
   (a) at least one compound selected from the group consisting of diacids, acid esters, and diesters; and
   (b) at least two diols;
   wherein the at least two diols comprise a disproportionated rosin diol and 2,2-bis(4-hydroxyphenyl)propane.

2. The polyester resin according to claim 1, wherein the disproportionated rosin diol is derived from a disproportionated distilled rosin acid.

3. The polyester resin according to claim 2, wherein the disproportionated distilled rosin acid has an acid value of from about 176 mg KOH to about 180 mg KOH.

4. The polyester resin according to claim 2, wherein the disproportionated distilled rosin acid is obtained by disproportionation and distillation of a crude rosin acid.

5. The polyester resin according to claim 1, wherein the disproportionated rosin diol is derived from a rosin acid and glycerine carbonate.

6. The polyester resin according to claim 1, wherein the polyester resin has a glass transition temperature of from about 50° C. to about 65° C.

7. The polyester resin according to claim 1, wherein the polyester resin has a softening point temperature of from about 110° C. to about 130° C.

8. The polyester resin according to claim 1, wherein the polyester resin has an acid value of from about 5 mg KOH/g to about 30 mg KOH/g.

9. The polyester resin according to claim 1, wherein the polyester resin has a polydispersity index (Mw/Mn) of from about 3 to about 100.

10. The polyester resin according to claim 1, wherein the at least one compound selected from the group consisting of diacids, acid esters, and diesters is selected from the group consisting of succinic acid, sebacic acid, and isophthalic acid.

11. A toner composition comprising toner particles comprising:
- a polyester resin comprising the polycondensation product of:
  - (a) at least one compound selected from the group consisting of diacids, acid esters, and diesters; and
  - (b) at least two diols;
  - wherein
    - the at least two diols comprise a rosin diol and 2,2-bis(4-hydroxyphenyl)propane.

12. The toner composition according to claim 11, wherein the polyester resin is amorphous.

13. The toner composition according to claim 12, further comprising a crystalline polyester resin.

14. The toner composition according to claim 11, wherein the toner particles have a particle size of from about 3 μm to about 20 μm.

15. The toner composition according to claim 11, wherein the toner particles have a circularity of from about 0.93 to about 0.99.

16. The toner composition according to claim 11, wherein the at least one compound selected from the group consisting of diacids, acid esters, and diesters is selected from the group consisting of succinic acid, sebacic acid, and isophthalic acid.

17. The toner composition according to claim 11, wherein a heat cohesion of the toner composition at a temperature of from about 50° C. to about 55° C. is from 0 to about 20 weight percent.

18. A method of preparing a polyester resin, the method comprising polycondensing
- (a) at least one compound selected from the group consisting of diacids, acid esters, and diesters; and
- (b) at least two diols;
- wherein the at least two diols comprise a rosin diol and 2,2-bis(4-hydroxyphenyl)propane.

19. The method according to claim 18, wherein the rosin diol is synthesized from a rosin acid and glycerine carbonate.

20. The method according to claim 19, wherein the rosin acid is obtained by disproportionation and distillation of a crude rosin acid, and the rosin acid has an acid value of from about 176 mg KOH to about 180 mg KOH.

* * * * *